Sept. 8, 1970  W. R. DOLLASE  3,527,305
DRAFT CONTROL LINKAGE
Filed Sept. 11, 1967  3 Sheets-Sheet 1
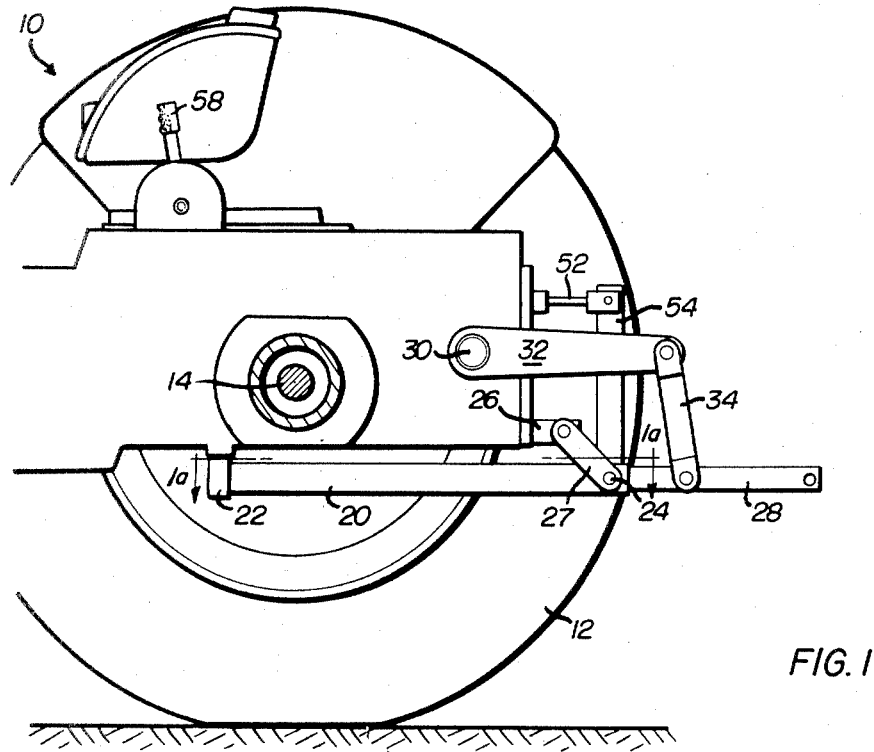
FIG. 1
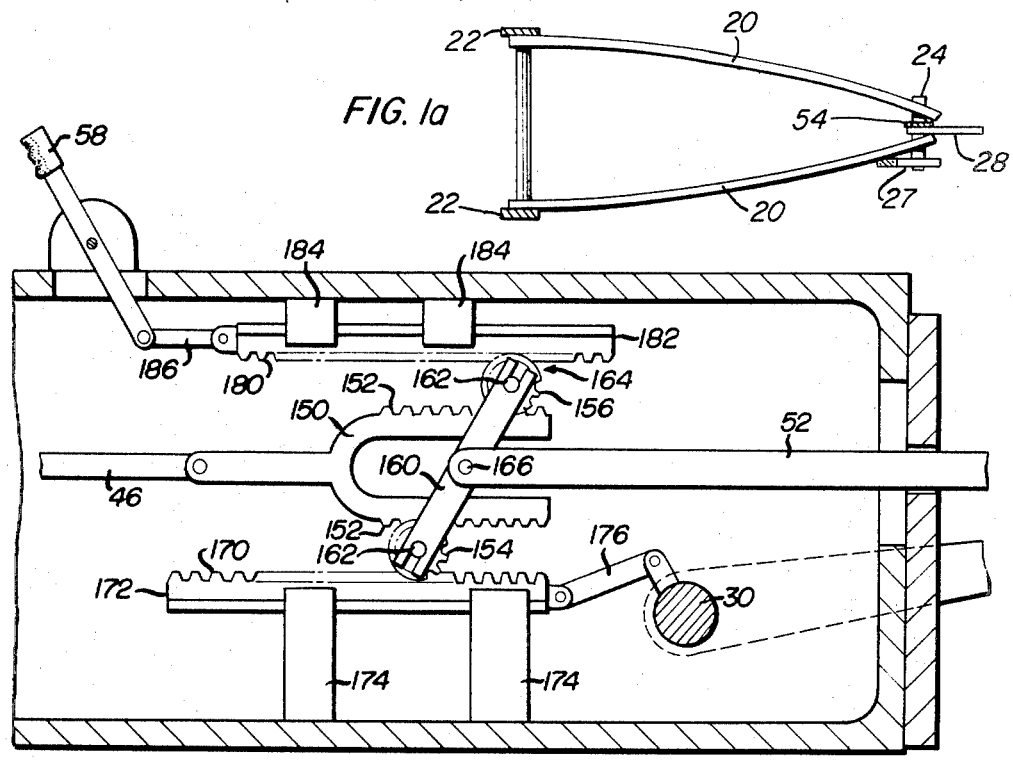
FIG. 1a
FIG. 5
INVENTOR.
WILLIAM R. DOLLASE.
BY
WILSON, SETTLE & BATCHELDER.
ATT'YS.

Sept. 8, 1970          W. R. DOLLASE                3,527,305
                    DRAFT CONTROL LINKAGE
Filed Sept. 11, 1967                           3 Sheets-Sheet 2

INVENTOR.
WILLIAM R. DOLLASE.
BY
WILSON, SETTLE & BATCHELDER.
ATT'YS.

Sept. 8, 1970 W. R. DOLLASE 3,527,305
DRAFT CONTROL LINKAGE
Filed Sept. 11, 1967 3 Sheets-Sheet 3

INVENTOR.
WILLIAM R. DOLLASE.
BY
WILSON, SETTLE & BATCHELDER.
ATT'YS.

United States Patent Office 3,527,305
Patented Sept. 8, 1970

3,527,305
DRAFT CONTROL LINKAGE
William R. Dollase, Racine, Wis., assignor to J. I. Case Company, Racine, Wis., a corporation of Wisconsin
Filed Sept. 11, 1967, Ser. No. 666,781
Int. Cl. A01b 63/112
U.S. Cl. 172—9        5 Claims

ABSTRACT OF THE DISCLOSURE

A vehicle having a draft-implement connected thereto with a fluid actuator moving, raising and lowering the implement on the vehicle and a valve that selectively supplies fluid to the actuator. A mechanism is interposed between the implement and the valve which is capable of selectively operating the valve through a manual control and variations in draft load on the implement as well as neutralizing the valve when a predetermined draft load is achieved.

BACKGROUND OF THE INVENTION

The present invention relates generally to vehicle drawn draft-implement and more particularly to improved draft control means for effectively changing the draft on the implement.

In the construction of ground engaging equipment, the implement is generally connected to a vehicle, such as a tractor, by a pivoted hitch linkage which is capable of being raised or lowered to vary the depth at which the implement is operated. It has become customery to provide draft control sensing mechanisms which are capable of automatically raising or lowering the implement relative to the vehicle to thereby maintain a constant draft on the implement. Most of these mechanisms likewise include some means for manually changing the desired draft load on the implement.

One type of mechanism which is capable of maintaining a constant draft on the implement and is capable of being adjusted to vary the sensitivity of the system is disclosed in Pat. No. 2,715,863. However, the system disclosed in this patent, as well as most of the systems which are known to the applicant, is very complicated in construction and extremely costly to produce as well as maintain.

SUMMARY OF THE INVENTION

The primary object of the present invention is to combine a simple, efficient and inexpensive mechanism which is capable of maintaining a constant draft on a tractor mounted implement.

Another object is to provide an improved draft control mechanism which is capable of automatically maintaining a constant draft load on the implement and incorporates a manual control for varying the amount of draft on the implement.

Other objects of this invention will appear in the following description and appended claims, reference being had to the accompanying drawings forming a part of this specification wherein like reference characters designate corresponding parts in the several views.

On the drawings

FIG. 1 shows a fragmentary side elevation view partially in section of a vehicle having an implement connected thereto;

FIG. 1a is a view through the line 1a of FIG. 1;

FIG. 5 is still a further modification of a draft control linkage of the invention.

Figure 2:
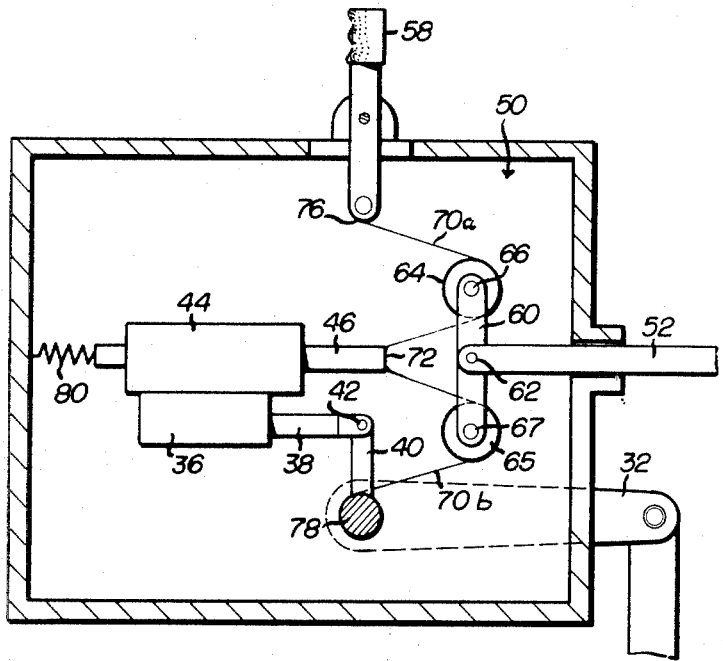
FIG. 2 is an enlarged fragmentary vertical section of the vehicle shown in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIG. 1 of the drawings shows a vehicle having an implement hitch secured thereto. In the illustrated embodiment, a fragmentary portion of a tractor 10 is shown including rear wheels 12 (only one of which is shown) supported on a main axle 14. An implement (not shown) is connected to the tractor 10 by a pair of bowed leaf springs 20 (FIG. 1a) joined at their forward ends by a bracket 22 carried on the tractor housing. The rear ends of the leaf springs 20 support a cross-shaft 24 which is also supported for longitudinal movement relative to the tractor by brackets 26 and links 27. The cross-shaft 24 also pivotally supports a pair of draft arms 28 (only one of which is shown) to which an implement is coupled in a conventional manner.

The means for raising and lowering the implement relative to the vehicle or tractor 10 includes a generally transversely extending rock shaft 30 having arms 32 (only one of which is shown) connected through links 34 to the draft arms 28. The rock shaft 30 is capable of being rotated or rocked in opposite directions by a fluid actuator 36 (FIG. 2) which has a piston rod 38 connected to an arm 40 secured to the rock shaft by a pin 42.

Valve means are provided for selectively supplying fluid to the actuator 36 and in the illustrated embodiment a valve 44 includes a valve spool or member 46 that is movable in opposite directions from a neutral position to thereby actuate the fluid motor 36.

A draft control linkage 50 is interposed between the spool 46 and a draft responsive member 52, which is connected to a link 54 (FIG. 1). The link 54 is fixedly secured to and movable with the cross-shaft 24. The linkage 50 is also capable of being moved by a manual control lever 58 mounted in the operator's compartment of the vehicle.

The linkage or mechanism 50 for controlling the movement of the valve spool from the neutral position has been the primary concern in providing an efficient and effective draft control system. Thus, as was mentioned above, it has been customary to provide a very elaborate controlling mechanism between the valve member or spool 46 and the draft responsive member 52.

According to the invention, the draft connection between the draft responsive member 52 (FIG. 2) and the valve spool 46 includes a shiftable lever 60 pivotally connected intermediate its ends by a pin 62 to the draft responsive member 52. The opposite ends of the lever 60 rotatably support sheaves or pulleys 64 and 65 on pins 66 and 67 carried by the shiftable link.

A flexible band 70 has an intermediate connection 72 to the end of the valve member or spool 46. One end of the flexible band, which may be of steel or other suitable material, is anchored at 76 to the manual control member 58 which is pivotally supported intermediate its ends. The opposite end of the band is connected at 78 to the rock shaft 30. The flexible band 70 is looped over the respective sheaves 64, 65 intermediate the connections 72, 76 and 78. The spool 46 is maintained in a neutral position by a spring 80 attached at its ends to the valve spool and casings which houses the control mechanism 59.

OPERATION OF FIG. 2

The operation of the system shown in FIGS. 1 and 2 is believed to be clearly apparent and is briefly summarized at this point. The tractor 10 is driven along a desired path along the ground and the depth of the implement is set by using the manual control lever 58. Thus, as the lever 58 is moved rearwardly, i.e., rotated clockwise as viewed in FIG. 2, the portion 70a of the flexible band is effectively lengthened between the connections 72 and 76. Since the rock shaft 30 and the draft responsive member 52 are stationary at this time, the lengthening of the flexible band portion 70a will move the valve spool 46 to the right as viewed in FIG. 2. Movement of the valve spool will supply fluid to the actuator 36 to thus rotate the rock shaft clockwise thereby lowering the implement carried by the draft arms 28. The clockwise rotation of the rock shaft 30 will increase the effective length of the flexible band portion 70b intermediate connections 72, 78 thereby allowing a tension spring 80, which is suitably attached at its ends to the valve spool 46 and the casing to return the valve spool to the neutral position.

After the desired setting has been made, a predetermined draft load will be sensed by the cross-shaft 24 and as long as this predetermined load is imposed on the implement the linkage 50 will be in a position corresponding to neutral or off position of the valve spool 46. However, should the draft on the implement be increased or decreased, this change in draft on the implement will be transmitted through the cross-shaft 24 and link 54 to the draft responsive member 52. Movement of the draft responsive member will disturb the balance in the linkage 50 which will cause the valve spool 46 to move from the neutral position. Thus, the actuator will rotate the rock shaft in the appropriate direction until the implement is returned to the desired predetermined draft load.

As can readily be appreciated, the linkage 50 provides a convenient, inexpensive and efficient manner of varying the draft or depth setting of an implement and at the same time making the linkage responsive to changes in draft on the implement.

FIG. 3 EMBODIMENT

Figure 3:
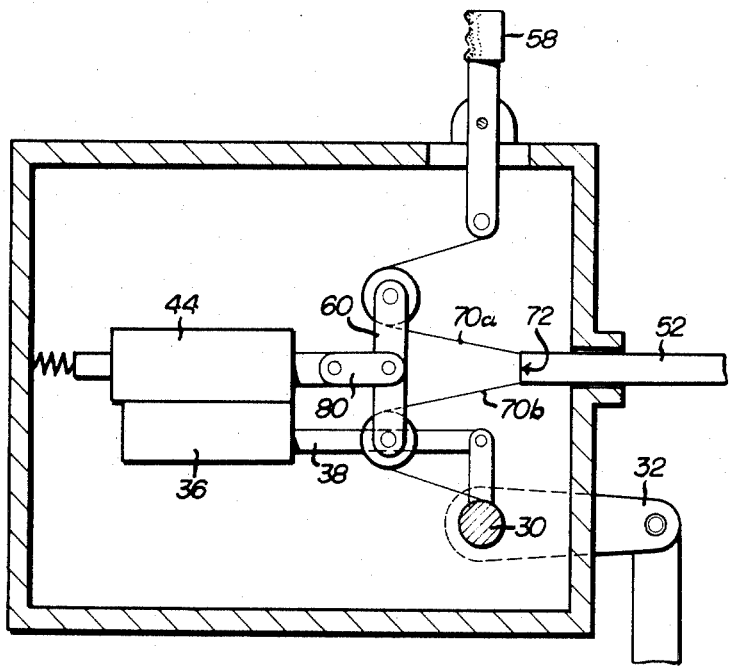
FIG. 3 is a view similar to FIG. 2 showing a modification of the draft control linkage shown in FIG. 1.

The embodiment shown in FIG. 3 is substantially identical to that disclosed in FIG. 2 and corresponding reference numerals have therefore been utilized for corresponding parts. In the embodiment shown in FIG. 3, the link 60 is connected to the valve spool 46 through a transmitting member 81 while the draft responsive member 52 is connected to the flexible band at the intermediate connection 72.

FIG. 4 EMBODIMENT

Figure 4:
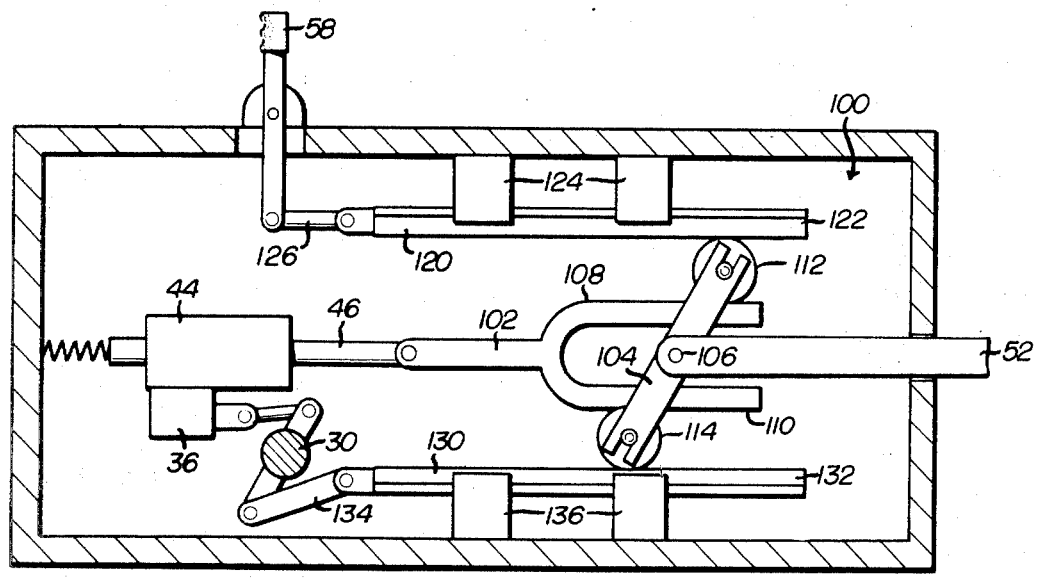
FIG. 4 is another modified form of the draft control linkage shown in FIG. 2.

A further modified form of draft control mechanism 100 is shown in FIG. 4 for operatively interconnecting the rock shaft 30, the valve spool 46, the draft responsive member 52 and the control lever 58. The mechanism 100 includes link 102 in the form of a Y-shaped member connected to the valve spool 46. An actuating link 104 is connected by a pivot pin 106 to the draft responsive member 52. The Y-shaped member 102 defines a pair of spaced contacting surface 108, 110 which are respectively engaged by friction wheels 112 and 114 floatingly carried on opposite ends of the link 104.

The friction member or wheel 112 also is in frictional engagement with a friction surface 120 defined on a bar or member 122. The bar 122 is guided for sliding movement along a predetermined path by suitable brackets 124 fixedly supported on the housing enclosing the mechanism. One end of the bar 122 is connected to a link 126 to the manual control member 58.

The second friction wheel 114 is likewise in constant engagement with a friction contacting surface 130 defined on a bar 132 connected by a link 134 to the rock shaft 30. The bar 132 is also guided for movement along a predetermined path on suitable brackets 136.

The operation of the mechanism 100 is substantially identical to that described in the embodiment of FIGS. 1 and 2. Thus, any movement of the draft responsive member 52 or the bars 122, 132 will be transmitted through the respective friction wheels 112, 114 to the Y-shaped member 102 shifting the valve spool 46 and reset the rock shaft 30 to the appropriate or corresponding setting.

FIG. 5 EMBODIMENT

A slightly further modification of the draft control linkage is shown in FIG. 5 and includes a rack 150 connected directly to the valve spool 46. The rack 150 has gear teeth 152 formed on respective spaced contacting surfaces which are in constant mesh with respective pinions 154 and 156. The pinions 154 and 156 are floatingly supported for rotation on opposite ends of a link 160 by pins 162 guided in slots 164. The link is connected intermediate its ends to member 52 by a pin 166.

The pinion 154 is in constant mesh with gear teeth 170 defined on a contacting surface of a rack or bar 172. The bar 172 is guided for movement along a predetermined path by brackets 174 and is connected through a link 176 to the rock shaft 30.

The pinion 156 is likewise in constant mesh with gear teeth 180 defined on a bar or rack 182. The bar or rack 182 is guided for movement along a predetermined path by brackets 184 and has one end connected through a link 186 to the manual control lever 58.

FIG. 6 EMBODIMENT

Figure 6:
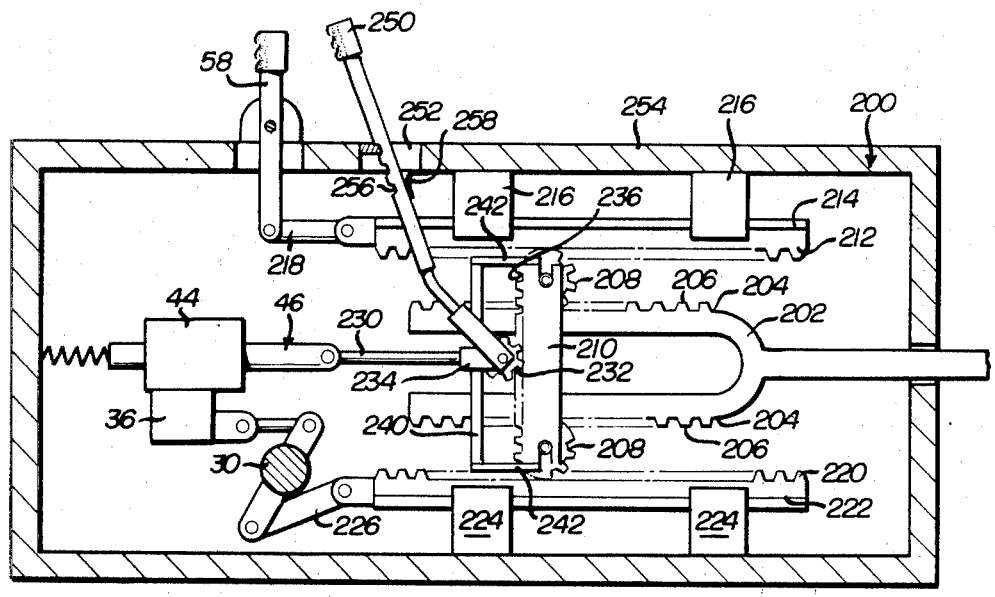
FIG. 6 is a further modified draft control linkage of the invention.

A still further modified embodiment is disclosed in FIG. 6 which is capable of being adjusted for independent draft control or position control. The mechanism 200 of FIG. 6 includes a rack 202 integrally formed with the draft responsive member 52 and having spaced contacting surfaces 204 which have gear teeth 206 defined thereon. The gear teeth 206 are in constant mesh with floating pinions 208 carried on the opposite ends of a shiftable link 210. The first pinion 208 also is in constant mesh with gear teeth 212 defined on a bar or rack 214 that is guided for movement on brackets 216 and is connected by a link 218 to the control lever 58.

The second pinion 208 is likewise in constant mesh with gear teeth 220 defined on a bar or rack 222 also supported for movement along a predetermined path by brackets 224 and connected through a link 226 to the rock shaft 30. A link 230 has one end connected to the valve spool 46 and the opposite end adjustably connected to the shiftable link 210. In the illustrated embodiment, the adjustable connection includes a pinion 232 rotatably suported between the legs of a clevis 234 formed on the end of the link 230. The pinion 232 is in constant mesh with gear teeth 236 formed on the forward edge of the link 210 and the pinion also contacts a bar 240, spaced from the forward edge of the link. The bar is fixedly secured to the link by brackets 242.

The pinion 232 is adapted to be moved up and down on the link 210 by a lever 250 extending upwardly and disposed in the operator's compartment of the vehicle. The control rod 250 extends through an aperture or slot 252 defined in the housing 254 and has a plurality of notches 256 formed thereon. A small leaf spring 258 biases the upper portion of the control rod against one end of the slot 252 to maintain one of the notches 256 in engagement with a portion of the housing 254.

As can be appreciated from the above description, the operation of the embodiment disclosed in FIG. 6 is substantially identical to those described above. Thus, the control lever 58, draft responsive member 52 and rock shaft 30 will independently shift the actuating link 210 to thereby move the valve spool in response to movement of any of the three members. Furthermore, by raising and lowering the pinion 232 on the link 210, the amount of movement of the valve spool in response to movement of any of the rock shaft 30, the draft responsive member 52 or the manual control member 58 will be varied.

If it is desired to operate the implement completely in response to movement of the manual control lever, the pinion 232 will be moved upwardly to be approximately in line with the pin supporting the upper pinion 208. In this position, any feed back from the rock shaft 32 through the bar 22 will not affect the position of the valve spool 46. However, movement of either of the control lever 58 or the draft responsive member 52 will be transmitted directly to the valve spool through the upper pinion 208. Thus, it is readily apparent that in this position the depth of the implement will correspond to the positional setting of the manual control lever.

Likewise, if the pinion 232 is lowered through the control rod 250 to a position substantially in alignment with the pin supporting the lower pinion 208, the system is entirely dependent upon the draft load of the implement and the positional setting of the manual control lever will have no substantial effect on the system.

RESUME OF OPERATION

It will be apparent from the foregoing description that the invention provides simple an efficient mechanisms for shifting the valve spool of a draft control system in response to independent movement of any of several members connected thereto.

While several preferred embodiments of the invention have been shown and described, it will be readily apparent to those skilled in the art that the invention is capable of various changes and modifications. Thus, the scope of the invention is indicated by the appended claims rather than the foregoing description.

I claim:
1. In a power operated system for an implement hitch movably mounting an implement on a tractor, said power system including a rotatable element mounted on said tractor and operatively connected to the implement hitch, said rotatable member rockable in opposite directions by a fluid actuator connected to the said rotatable member for changing the position of the implement, valve means on said tractor in fluid communication with said actuator, said valve means having a valve member movable in opposite directions from a neutral position for supplying fluid for operating said actuator, manual control means having plural settings each corresponding to a selected one of the implement positions, and a draft responsive member operatively connected to said valve means and movable in response to changes in the draft load applied to the implement, the improvement comprising a motion transmitting means including a shiftable actuating lever operatively connected to one of said members, band means operatively interconnecting each of the opposite ends respectively to said manual control and to said rotatable element so as to position said valve member in accordance with the setting of said manual control and thereby cause said actuator to correspondingly rotate said rotatable element to change the position of the implement, means operatively joining said draft responsive member to said implement so that said draft responsive member is responsive to changes in the draft load imposed on said implement, and biasing means normally urging said motion transmitting means to correspondingly shift said lever and said valve member to thereby change the position of the implement from the selected position so that the predetermined draft load is maintained in a position corresponding to the neutral position of said valve member.

2. A power operated system as defined in claim 1, in which said one member is the draft responsive member and said other member is the valve member.

3. A power operated system as defined in claim 1, in which said band means includes a flexible band having opposite ends respectively connected to said manual control means and said rotatable member and an intermediate portion connected to said valve member and a contacting member on the opposite ends of said lever respectively engaging said band between the intermediate connection and said end connection whereby movement of either of said manual control or said rotatable member varies the effective length of said flexible band to shift said lever and modify the position of said valve member.

4. A power operated system as defined in claim 3, in which said connecting means includes linkage connecting said draft responsive member to said implement whereby changes in the draft load on the implement shift said lever to modify the position of said valve member.

5. A power operated system as defined in claim 1, in which said one member is the valve member and said other member is the draft responsive member.

References Cited

UNITED STATES PATENTS 2,722,874  11/1955  Bopf _____ 172—9
Re. 25,512  1/1964  Presnell et al. _____ 172—9

ROBERT E. PULFREY, Primary Examiner

S. C. PELLEGRINO, Assistant Examiner

U.S. Cl. X.R.
172—465